(12) United States Patent
Newsome et al.

(10) Patent No.: US 11,408,544 B2
(45) Date of Patent: Aug. 9, 2022

(54) FLUID COUPLING

(71) Applicant: Eaton Intelligent Power Limited, Dublin (IE)

(72) Inventors: William H. Newsome, Dexter, MI (US); Gary M. Jenski, Jr., Jackson, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/083,664

(22) Filed: Oct. 29, 2020

(65) Prior Publication Data
US 2021/0131600 A1    May 6, 2021

Related U.S. Application Data

(60) Provisional application No. 62/928,670, filed on Oct. 31, 2019.

(51) Int. Cl.
| | | |
|---|---|---|
| *F16L 29/04* | (2006.01) | |
| *F16L 57/04* | (2006.01) | |
| *F16J 15/06* | (2006.01) | |
| *F16J 15/02* | (2006.01) | |
| *F16L 37/413* | (2006.01) | |
| *F16J 15/08* | (2006.01) | |
| *F16J 15/10* | (2006.01) | |

(52) U.S. Cl.
CPC ............. *F16L 29/04* (2013.01); *F16J 15/022* (2013.01); *F16J 15/068* (2013.01); *F16J 15/0806* (2013.01); *F16J 15/102* (2013.01); *F16L 37/413* (2013.01); *F16L 57/04* (2013.01)

(58) Field of Classification Search
CPC ......... F16L 37/413; F16L 37/34; F16L 29/02; F16L 29/04; F16L 57/04; F16L 2201/20; F16J 15/068; F16J 15/022; F16J 15/0806; F16J 15/102; F16J 15/164
See application file for complete search history.

(56) References Cited

U.S. PATENT DOCUMENTS

| | | | | |
|---|---|---|---|---|
| 2,456,045 A | * | 12/1948 | Brock | F16L 29/04 137/614.03 |
| 3,446,245 A | * | 5/1969 | Snyder, Jr. | F16L 37/32 137/614.03 |
| 3,706,318 A | * | 12/1972 | Baniadam | F16L 29/04 137/614.03 |
| 3,934,066 A | * | 1/1976 | Murch | E04B 1/94 442/221 |

(Continued)

*Primary Examiner* — David Colon-Morales
(74) *Attorney, Agent, or Firm* — Merchant & Gould P.C.

(57) ABSTRACT

A fluid coupling including a first adapter, a second adapter configured to selectively connect with and disconnect from the male adapter, an inner sleeve, a first seal between the first adapter and the inner sleeve, a second seal between the second adapter and the inner sleeve, and at least one thermally-activated seal between two of the first adapter, the second adapter, and the inner sleeve. During normal operation, the at least one thermally-activated seal may be spaced apart from at least one of the two of the first adapter, the second adapter, and the inner sleeve. At or above a predetermined temperature, the thermally-activated seal may be configured to expand to create a seal between the two of the first adapter, the second adapter, and the sleeve.

16 Claims, 4 Drawing Sheets

(56) References Cited

U.S. PATENT DOCUMENTS

| | | | | |
|---|---|---|---|---|
| 4,269,389 | A * | 5/1981 | Ekman | F16L 37/23 |
| | | | | 137/614.03 |
| 5,427,386 | A * | 6/1995 | Breaker | F16J 15/008 |
| | | | | 277/608 |
| 6,405,502 | B1 * | 6/2002 | Cornwall | F16L 5/04 |
| | | | | 285/42 |
| 6,679,015 | B1 * | 1/2004 | Cornwall | A62C 2/065 |
| | | | | 52/1 |
| 7,111,641 | B2 * | 9/2006 | Marban | F16L 37/28 |
| | | | | 137/614.03 |
| 8,356,972 | B2 | 1/2013 | Howard et al. | |
| 8,474,829 | B2 | 7/2013 | Otsuka et al. | |
| 8,690,534 | B1 | 4/2014 | Janocko et al. | |
| 10,302,232 | B2 * | 5/2019 | Maiville | F16L 57/04 |
| 10,767,565 | B2 * | 9/2020 | Di Florio | F01D 11/005 |
| 2005/0161886 | A1 * | 7/2005 | Berry | F16J 15/068 |
| | | | | 277/605 |
| 2012/0038115 | A1 | 2/2012 | Herrera et al. | |
| 2018/0051634 | A1 * | 2/2018 | Di Florio | F16L 57/04 |
| 2018/0087708 | A1 * | 3/2018 | Jenski | F16L 29/04 |

\* cited by examiner

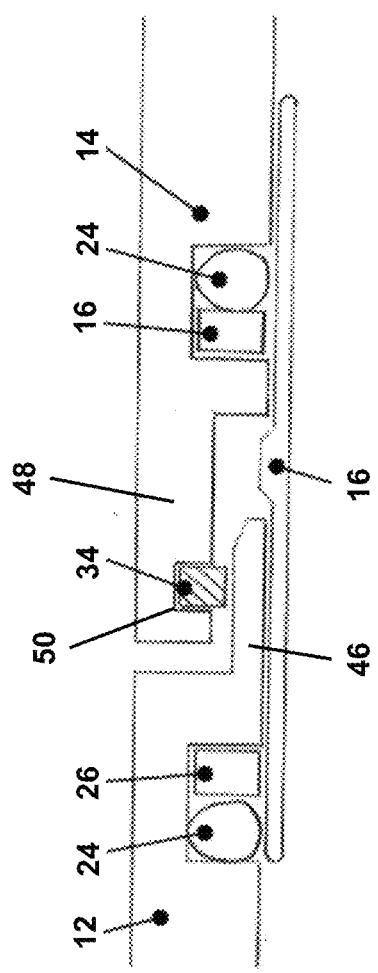

FLUID COUPLING

CROSS-REFERENCE TO RELATED APPLICATION

This application claims the benefit of U.S. Provisional Patent Application Ser. No. 62/928,670, filed on Oct. 31, 2019, the disclosure of which is hereby incorporated by reference in its entirety as though fully set forth herein.

TECHNICAL FIELD

The present disclosure generally relates to fluid couplings, including, but not limited to, quick-disconnect fluid couplings, that may be used in high temperature environments.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Fluid couplings, such as quick disconnect couplings, utilized in fluid conveyance systems (e.g., hydraulic and fuel) generally may include seals (e.g., O-rings) and/or backup rings to maintain a fluid-tight seal between two components (e.g., a male adapter and a female adapter) being coupled together. The seals generally are constructed from an organic material with elastomeric properties. The fluid couplings may be required to function in severe, high-temperature working environments (e.g., above 600 degrees F.) in which the organic material of the seal rings may begin to degrade, which may eventually cause the fluid couplings to begin to leak. To address the situation, insulation may be added to the fluid couplings. However, such insulation may be bulky. Metallic seals may be configured for use with high temperatures, but may not be sufficiently compliant and/or may not provide low sliding friction.

Accordingly, there is a desire for solutions/options that address or eliminate one or more challenges or shortcomings of such fluid couplings. The foregoing discussion is intended only to illustrate examples of the present field and should not be taken as a disavowal of scope.

SUMMARY

In embodiments, a fluid coupling may include a first adapter, a second adapter configured to selectively connect with and disconnect from the male adapter, an inner sleeve, a first seal between the first adapter and the inner sleeve, a second seal between the second adapter and the inner sleeve, and at least one thermally-activated seal between two of the first adapter, the second adapter, and the inner sleeve. During normal operation, the at least one thermally-activated seal may be spaced apart from at least one of the two of the first adapter, the second adapter, and the inner sleeve. At or above a predetermined temperature, the thermally-activated seal may be configured to expand to create a seal between the two of the first adapter, the second adapter, and the sleeve.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 5 is a cross-sectional view generally illustrating an embodiment of a thermally-expanded seal between a male adapter and a female adapter of a fluid coupling according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
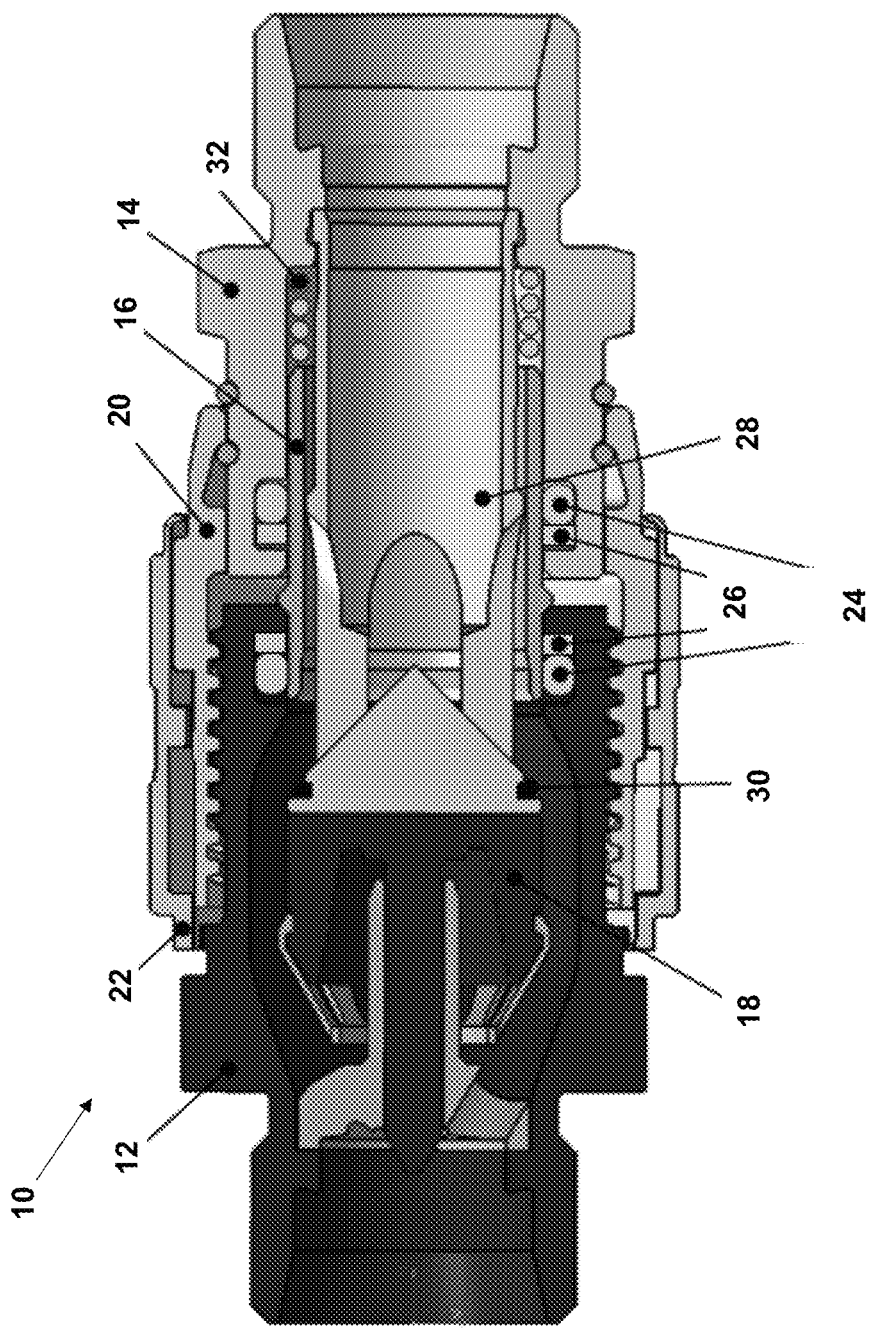
FIG. 1 is a cross-sectional view generally illustrating an embodiment of a fluid coupling according to teachings of the present disclosure.

As generally illustrated in FIG. 1, a fluid coupling 10 may include a first adapter 12 (e.g., a male adapter), a second adapter 14 (e.g., a female adapter), an inner sleeve 16 (e.g., a valve sleeve), a poppet valve 18, a nut 20, an outer sleeve 22 (e.g., a locking sleeve), one or more sealing members 24 (e.g., O-rings), one or more back-up rings 26, a tubular valve 28, and/or a bonded seal 30. The first adapter 12 may be configured for connection with a first fluid conduit. The second adapter 14 may be configured for connection with a second fluid conduit. The first adapter 12 and the second adapter 14 may be configured to provide fluid communication between the first fluid conduit and the second fluid conduit. The fluid coupling 10 may be configured as a quick-disconnect coupling.

In embodiments, in a disconnected position of the first adapter 12 and the second adapter 14, the inner sleeve 16 may contact the bonded seal 30 and a sealing member 24 connected to the second adapter 14, which may restrict and/or prevent fluid flow through the second adapter 14. The poppet valve 18 may contact a sealing member 24 connected to the first adapter 12, which may restrict and/or prevent fluid flow through the first adapter 12.

With embodiments, in a connected position of the first adapter 12 and the second adapter 14, such as generally illustrated in FIG. 1, the nut 20 may be connected to (e.g., threaded onto) the first adapter 12. As the nut 20 rotates, the first adapter 12 may drive the inner sleeve 16 in a first axial direction (e.g., toward the second fluid conduit), which may open one or more ports of the tubular valve 28. The inner sleeve 16 may then contact both of the sealing members 24, which may provide a fluid seal between the first adapter 12 and the second adapter 14 and/or allow fluid flow through the fluid coupling 10. A spring 32, such as a coil spring or other spring-like component, may provide an actuation force on the inner sleeve 16. The outer sleeve 22 may be disposed at least partially around the nut 20 to restrict and/or prevent the nut 20 from disconnecting (e.g., unscrewing) from the first adapter 12.

In embodiments, connecting and/or disconnecting the first adapter 12 and the second adapter 14 may include movement of the poppet valve 18, the inner sleeve 16, the nut 20, and/or the outer sleeve 22 relative to each other. Clearances may be provided between one or more of these components, such as to prevent binding during relative movement.

With embodiments, a fluid seal between the first adapter 12 and the second adapter 14 may depend, at least in part, on the integrity of the sealing members 24. The sealing members 24 may, for example and without limitation, include an organic material with elastomeric properties (e.g., rubber). At high pressures (e.g., at least about 1500 psig), the back-up rings 26 may be configured to restrict deformation of the sealing members 24 into the clearances. The sealing members 24 may start to degrade at high temperatures, such as about 600 degrees Fahrenheit or greater. If a sealing member 24 degrades, the fluid seal may be compromised, and fluid may leak from the fluid coupling 10.

Figure 2:
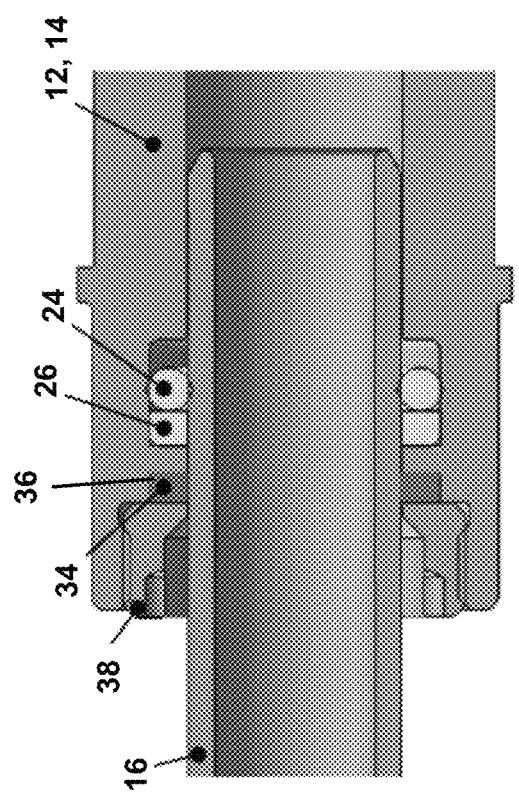
FIGS. 2 and 3 are cross-sectional views generally illustrating embodiments of a thermally-expanded seal between an adapter and a sleeve of a fluid coupling according to teachings of the present disclosure.
Figure 3:
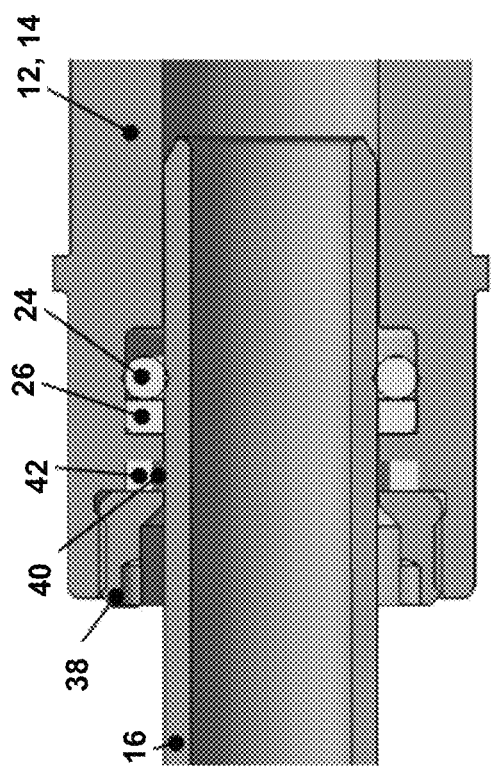

In embodiments, such as generally illustrated in FIGS. 2 and 3, the fluid coupling 10 may include a thermally-activated seal 34 disposed between the inner sleeve 16 and the first adapter 12 and/or between the inner sleeve 16 and the second adapter 14. The thermally-activated seal 34 generally may be configured to provide a fluid seal between the inner sleeve 16 and the respective adapter 12, 14 in a circumstance in which the respective sealing member 24 degrades or otherwise fails to function properly at high temperatures.

With embodiments, the thermally-activated seal 34 may be disposed at least partially in a recess 36 of the adapter 12, 14. A plug 38 may retain the thermally-activated seal 34 in the recess 36. At normal operating temperatures, the thermally-activated seal 34 may be radially spaced apart from the inner sleeve 16 and/or the adapter 12, 14. This may allow for relative movement of the inner sleeve 16 with respect to the adapter 12, 14 to permit leak-free connection and disconnection of the fluid coupling 10. At elevated temperatures above normal temperatures (e.g., at or above 600 degrees Fahrenheit), the thermally-activated seal 34 may be configured to expand due to thermal growth. Such thermal expansion generally may be radially inward toward the inner sleeve 16 until the thermally-activated seal 34 comes into contact with the inner sleeve 16, thereby creating a seal between the inner sleeve 16 and the adapter 12, 14.

In embodiments, the thermally-activated seal 34 may have a higher coefficient of thermal expansion than the adapter 12, 14 and/or the plug 38. The thermally-activated seal 34 may comprise a material or materials that may maintain high strength well beyond the elevated temperatures at which the sealing members 24 and/or backup rings 26 may fail. For example and without limitation, the material(s) may include polyether ether ketone, polybenzimidazole, polyimide, and/or aluminum.

With embodiments, there may be an interference between an outer diameter of the thermally-activated seal 34 and an inner diameter of the adapter 12, 14 at the recess 36. The interference may be of sufficient magnitude to generate internal stresses in the thermally-activated seal 34 that lie just below an acceptable yield or creep strength at a maximum operating temperature of the fluid coupling 10.

In embodiments, the thermally-activated seal 34 may be press-fit into the adapter 12, 14. Due to the elastic nature of the thermally-activated seal 34, the volume of the thermally-activated seal 34 may be slightly lower after being press-fit than before. The additional volume may be recovered as stress is relieved during expansion at the elevated temperatures, thereby creating improved contact between the thermally-activated seal 34 and the inner sleeve 16 to create the seal therebetween.

With embodiments, such as generally illustrated in FIG. 3, the thermally-activated seal 34 may include a radially inner component 40 and a radially outer component 42. The radially inner component 40 generally may be made of a material having high strength. For example and without limitation, the material(s) may include polyether ether ketone, polybenzimidazole, polyimide, and/or aluminum. The radially outer component 42 may be made of a material of low strength and extremely high volumetric change. For example and without limitation, the material may be a thermoplastic, such as virgin polytetrafluoroethylene.

In embodiments, the radially inner component 40 may be longitudinally and tightly secured between the plug 38 and the adapter 12, 14. As such, radial flow of the radially outer component 42 may be limited. As a result, the radially outer component 42, via its expansion at elevated temperatures, may apply a radial force on the radially inner component 40 to drive it into contact with the inner sleeve 16, similar to a piston. Via such a configuration, the radially inner component 40 may only need to have a sufficient radial thickness to cover a gap between the plug 38 and the inner sleeve 16. As such, a minimum amount of material of the radially inner material may be needed, where the rest of the recess 36 may be filled by the radially outer component 42.

Figure 4:
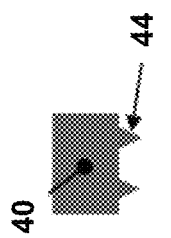
FIG. 4 is a cross-sectional view generally illustrating an embodiment of a radially inner component of a thermally-expanded seal according to teachings of the present disclosure.

With embodiments, such as generally illustrated in FIG. 4, the radially inner component 40 may include one or more ribs 44 extending radially inward to engage with the inner sleeve 16. As a result of a force balance, the contact stresses between the rib(s) 44 and the inner sleeve may be higher than a flat or plain surface. Such higher contact stress may increase the integrity of the seal formed between the thermally-activated seal 34 and the inner sleeve 16.

In embodiments, such as generally illustrated in FIG. 5, the thermally-activated seal 34 may be between the first adapter 12 and the second adapter 14, as opposed to between one of the adapters 12, 14 and the inner sleeve 16. Each of the adapters 12, 14 may have an axially-extending flange 46, 48, respectively. The flanges 46, 48 may be spaced apart from each other in a radial direction. The radially outermost flange 48 may include a groove 50 in which the thermally-activated seal 34 may be disposed. The thermally-activated seal 34 may be spaced from the radially innermost flange 46 at normal operating temperatures, and may engage the radially innermost flange 46 upon expansion at elevated temperatures. As with the embodiments illustrated in FIGS. 2 and 3, a material or materials of the thermally-activated seal 34 may include, without limitation, polyether ether ketone, polybenzimidazole, polyimide, and/or aluminum. In contrast with some embodiments, only one thermally-activated seal 34 may be needed to prevent a fluid leak should both sealing members 24 fail, as opposed to two in the embodiments illustrated in FIGS. 2 and 3. Having one thermally-activated seal 34 as opposed to two may reduce an overall length of the fluid coupling 10 as well as reduce costs.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A fluid coupling comprising:
    a first adapter;
    a second adapter;
    an inner sleeve;
    a first seal between the first adapter and the inner sleeve;
    a second seal between the second adapter and the inner sleeve; and
    at least one thermally-activated seal between two of the first adapter, the second adapter, and the inner sleeve;
    wherein, during normal operation, the at least one thermally-activated seal is spaced apart from at least one of the two of the first adapter, the second adapter, and the inner sleeve; and, at or above a predetermined temperature, the thermally-activated seal is configured to expand to create a seal between the two of the first adapter, the second adapter, and the inner sleeve; and
    wherein the at least one thermally-activated seal is between the inner sleeve and one of the first adapter and the second adapter, and is retained in a recess of the one of the first adapter and the second adapter by a plug.

2. The fluid coupling of claim 1, wherein a coefficient of thermal expansion of the at least one thermally-activated seal is greater than respective coefficients of thermal expansion of the one of the first adapter or the second adapter and of the plug.

3. The fluid coupling of claim 1, wherein the at least one thermally-activated seal is press-fit into the recess.

4. The fluid coupling of claim 1, wherein the at least one thermally-activated seal comprises at least one of polyether ether ketone, polybenzimidazole, polyimide, or aluminum.

5. The fluid coupling of claim 1, wherein the at least one thermally-activated seal includes a radially inner component and a radially outer component having a greater coefficient of thermal expansion than the radially inner component.

6. The fluid coupling of claim 5, wherein at least one of:
    the radially outer component comprises a thermoplastic; and
    the radially inner component comprises at least one of polyether ether ketone, polybenzimidazole, polyimide, or aluminum.

7. The fluid coupling of claim 6, wherein the thermoplastic is virgin polytetrafluoroethylene.

8. The fluid coupling of claim 5, wherein the radially inner component includes at least one rib protruding radially inward towards the inner sleeve.

9. The fluid coupling of claim 1, wherein the at least one thermally-activated seal is between the first adapter and the second adapter.

10. The fluid coupling of claim 9, wherein the one of the first adapter or the second adapter includes a first axially-extending flange with a groove in which at least a portion of the at least one thermally-activated seal is disposed.

11. The fluid coupling of claim 10, wherein the other of the first adapter or the second adapter includes a second axially-extending flange disposed radially interior to the first axially-extending flange, the at least one thermally-activated seal being radially spaced apart from the second axially-extending flange in the normal operation.

12. The fluid coupling of claim 9, wherein the at least one thermally-activated seal comprises at least one of polyether ether ketone, polybenzimidazole, polyimide, or aluminum.

13. The fluid coupling of claim 1, wherein the at least one thermally-activated seal includes a first thermally-activated seal between the first adapter and the inner sleeve, and a second thermally-activated seal between the second adapter and the inner sleeve.

14. The fluid coupling of claim 1, wherein the predetermined temperature is 600 degrees F. or above.

15. A fluid coupling comprising:
    a male adapter;
    a female adapter;
    a valve sleeve;
    a locking sleeve;

a first thermally-activated seal between the male adapter and the valve sleeve; and a second thermally-activated seal between the female adapter and the locking sleeve;

wherein, during normal operation, the first and second thermally-activated seals are spaced apart from the valve sleeve; and, at or above a predetermined temperature, the first and second thermally-activated seals are configured to expand to create seals between the valve sleeve and each of the male adapter and the female adapter; and wherein each of the first and second thermally-activated seals includes a radially inner component and a radially outer component, the radially inner component having a greater strength than the radially outer component, and the radially outer component having a greater coefficient of thermal expansion than the radially inner component.

16. A fluid coupling comprising:

a first adapter;

a second adapter;

an inner sleeve;

a first seal between the first adapter and the inner sleeve;

a second seal between the second adapter and the inner sleeve; and at least one thermally-activated seal between two of the first adapter, the second adapter, and the inner sleeve;

wherein, during normal operation, the at least one thermally-activated seal is spaced apart from at least one of the two of the first adapter, the second adapter, and the inner sleeve; and, at or above a predetermined temperature, the thermally-activated seal is configured to expand to create a seal between the two of the first adapter, the second adapter, and the inner sleeve; and wherein the at least one thermally-activated seal is between the inner sleeve and one of the first adapter and the second adapter, and the at least one thermally-activated seal includes a radially inner component and a radially outer component having a greater coefficient of thermal expansion than the radially inner component.

* * * * *